United States Patent [19]

Herrett

[11] Patent Number: 5,103,623
[45] Date of Patent: Apr. 14, 1992

[54] APPARATUS AND METHOD FOR HARVESTING AGRICULTURAL PRODUCE

[75] Inventor: James W. Herrett, Filer, Id.

[73] Assignee: Logan Farm Equipment Company, Idaho Falls, Id.

[21] Appl. No.: 556,083

[22] Filed: Jul. 20, 1990

[51] Int. Cl.⁵ ............... A01D 17/04; A01D 33/02
[52] U.S. Cl. .................... 56/14.7; 56/16.5; 56/16.6; 171/131; 460/904
[58] Field of Search .......... 56/14.7, 16.4, 16.5, 56/16.6, 203, 228, 327.1, 473.5, DIG. 2, DIG. 5; 460/904, 8, 149, 150, 901, 119; 171/130, 131, 111, 127

[56] References Cited

U.S. PATENT DOCUMENTS

| | | | |
|---|---|---|---|
| 3,333,644 | 8/1967 | Lavergne | 171/130 |
| 4,392,533 | 7/1983 | Bittle | 56/327.1 |
| 4,640,364 | 2/1987 | Theurer | 171/131 |
| 4,842,076 | 6/1989 | Welp | 171/130 |

Primary Examiner—Terry Lee Melius
Attorney, Agent, or Firm—Workman, Nydegger & Jensen

[57] ABSTRACT

Harvested agricultural produce is distributed and temporarily stored in an elongated, low-profile bin mounted and supported above a frame so as to substantially center the weight of the produce over the frame. The bin has an input and an output end and is capable of movement between a receiving position in which produce is loaded into the bin and an unloading position in which produce in the bin is transferred out. In moving into the unloading position, the bin is translated in a longitudinal direction from the input end to the output end, and the output end of the bin becomes elevated. Means are provided to support the bin over the frame in the receiving and unloading positions, and to drive the bin therebetween. A conveyor belt in the floor of the bin shifts produce within the bin and unloads produce into a transport carrier. An unloading extension capable of pivoted downward movement is attached to the output end of the bin and provided with a horizontally pivoted door and a flexible drop chute attached between the door and the unloading extension. The bin can be incorporated into a system which employs separating means for moving the produce along a processing pathway. On such a pathway, the produce is separated from associated waste material and transported to the bin. The frame is supported on steerable wheels which may be selectively located either inboard or outboard of the frame to change the stability of the harvester.

42 Claims, 11 Drawing Sheets

APPARATUS AND METHOD FOR HARVESTING AGRICULTURAL PRODUCE

BACKGROUND

1. Field of the Invention

The present invention relates to methods and apparatus for harvesting agricultural produce. More specifically the present invention relates to methods and apparatus for receiving, storing, and selectively transferring agricultural produce into a transport carrier.

2. Prior Art

Harvesting of agricultural produce is a task that has been performed in a variety of ways by farmers for countless generations. It is a labor that is not restricted to any particular area, but is common through out the world.

Originally, harvesting began by manual labor, whereby individuals would pick an agricultural product out of the ground by hand, clean-off clumps of soil from the product, and place the goods in a temporary container to await final delivery. Harvesting by this process, however, was obviously costly in terms of worker time and energy.

With the development of modern technology, harvesters were constructed which eliminated much of the manual labor that had previously been necessary to carry out harvesting functions, and thereby decreased the amount of time required for harvesting. In a basic harvester, means are provided by machines to physically extract agricultural produce from the soil. These extraction means are typically combined with means to clean the extracted agricultural produce and for separating the produce from associated waste materials. Once these processes are completed, the processed produce is stored temporarily in the field until it can be placed in a final storage area, such as a warehouse, or shipped to market.

The basic harvester is pulled by a tractor. Mechanisms on the harvester for processing produce are powered from the tractor. Once out of the ground, the produce is cleaned for example by a rod link conveyor as it moves the produce to a temporary storage facility in the field.

One way agricultural produce has been temporarily stored has been by the use of an vehicle adjacent to a harvester. Typically, a truck is driven along the side of a harvester. Processed agricultural goods are dispensed from the harvester to the traveling truck. Usually, this can be accomplished without the need for lengthy stops by the harvester to exchange each full vehicle with a new empty one.

Unfortunately, problems arise when an adjacent vehicle is necessary to store the agricultural produce and must be driven alongside the harvester. First, the use of a vehicle along the side of the harvester increases the amount of labor and equipment required for harvesting a crop because one person is needed to operate and tow the harvester, while another is needed to operate the accompanying storage vehicle.

Also, the space occupied by the accompanying vehicle, at least on the first pass of the harvester along the edge of the field, is unable to be harvested, as the weight of the vehicle crushes the unharvested crops as it drives over them. Although on subsequent passes of the harvesting process, the accompanying vehicle can be driven next to the harvester over already harvested soil, initially, the vehicle must be driven over unharvested soil.

Most harvesters employing an adjacent accompanying vehicle harvest agricultural products in plots of countless hundreds of acres. Because of the large amount of land that is set aside for the harvesting process, the loss of merely one row of crops on the first pass of the equipment through the field is not a severe detriment to the entire operation.

Not all farmers, however, cultivate such large land areas. This is the case in most areas of Asia, Africa, South America and in some areas of Europe and North America. In such areas, it is not desireable to employ the types of harvesters thus far described because the loss of even one row of unharvested agricultural produce due to the temporary storage of the goods in an accompanying vehicle is a big problem. Instead, where the local farming economics permit mechanized harvesting, farmers employ harvesters that have been designed to provide for temporary produce storage directly thereupon. This prevents the destruction of even a single row of unharvested agricultural produce.

Transient produce storage harvesters which have been used previously, generally place a storage container for the produce directly on the top of the frame of the harvester. The location of such containers is at the front of the harvester, because typically the rear is employed as a processing pathway to separate the agricultural produce from associated waste material.

The configuration of the storage containers is very tall with the longer sides of the container sides extending laterally across the front of the harvester. This allows for a greater amount of produce which can be temporarily stored and decreases the number of times the container has to be emptied once it is filled to capacity. Also, the containers have side doors which may be opened to permit the accumulated harvested produce to exit the container. By way of example, FIG. 1 illustrates such a harvester 10 in which a storage container takes the form of a high profile tank 12 located at the end of harvester 10 adjacent the towing vehicle 14 by which the harvester is towed through the field of harvest.

Produce 16, shown by way of example as potatoes, is transferred to tank 12 by a conveyor belt 18 and allowed to fall to the floor of tank 12 as shown by arrows A. Tank 12, being tall and wide, positions the weight of produce 16 in one concentrated area of the frame 20 of harvester 10.

Discharge of produce 16 from the tank 12 is accomplished through a door 22 on one side of tank 12. A hydraulic ram 24 positioned on the side of tank 12 causes door 22 to open downwardly along a hinge on the bottom of tank 12. As door 22 opens, scissored side walls unfold so that produce is not spilled from the tank. A conveyor belt along the floor of tank 12 and along the inside surface of door 22 then operates to push the produce out of the tank into a transport carrier.

Although transient produce storage harvesters such as harvester 10 shown in FIG. 1, accomplish some goals for which they were designed, they fail to accomplish those goals in an optimum manner. For the most part, because the containers are very tall and wide, the weight of the produce they carry is concentrated in one central area of the harvester. This creates stress on the harvester system generally. Also, steering problems occur in the vehicle towing the harvester, because the weight of the stored produce is concentrated close to the tow bar by which the towing vehicle 14 tows harvester 10. Tremendous stress is imposed on the tow bar.

The high profile of transient produce storage harvesters also causes problems with tipping. The high center of gravity causes great instability. If the harvester encounters any side-to-side movement, the momentum of the stored produce can tip the entire harvester off of its wheels into an inoperational position on its side.

An additional problem with the tall configuration of the storage container is that it causes damage to the produce. In the beginning stages of filling tank 12, the produce must fall a great distance between conveyor belt 18 and the floor of tank 12. Because of this fall, the produce becomes bruised and damaged. Then, as filling proceeds and more and more produce is stacked in tank 10, more and more pressure is exerted upon the produce in the bottom. This growing pressure further bruises and damages the bottom produce.

BRIEF SUMMARY AND OBJECTS OF THE INVENTION

In light of the above-described deficiencies in prior transient produce storage harvesters, the object of the present invention will be briefly stated.

One object of the present invention is an improved method and apparatus for harvesting and temporarily storing agricultural produce, wherein the weight of the agricultural produce is distributed throughout the harvester.

Another object of the present invention is to provide such a method and apparatus which minimizes damage to the agricultural produce as it is transferred into the storage container for temporary storage.

Another object of the present invention is to provide such a method and apparatus which increases the efficiency of transient product storage harvesters and reduces the costs incurred in employing such harvesters.

Yet another object of the present invention is to provide a harvester capable of improved transient product storage which is not as susceptible to tipping as prior art harvesters.

An additional object of the present invention is to provide a transient product storage harvester which evades the steering problems common to prior art harvesters.

Still another object of the present invention is to provide to farmers who cultivate a proportionately small amount of land, a transient product storage harvester which can be used without destruction to any unharvested land.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus for use in an agricultural field for temporarily storing recently harvested agricultural produce and selectively transferring the produce into a transport carrier is provided. The apparatus comprises a frame and a bin or storage means supported above the frame.

The bin is elongated with a low-profile. It has an input end and an output end, and a floor. The bin is capable of movement between a receiving position and an unloading position. When the bin is in a receiving position, it is capable of receiving the harvested agricultural produce. As the bin moves to its unloading position, it moves in a longitudinal direction from the input end to the output end, extending the output end beyond the frame, and elevating the output end relative to the output end in the receiving position. When the output end is elevated, the agricultural produce can be unloaded.

Also provided is a motive means for moving the bin from its receiving position to its unloading position and support means for supporting the bin in its receiving and unloading positions. A discharge means shifts the agricultural produce within the bin and unloads the stored agricultural produce from the bin to a transport carrier. The support means of the present invention comprises a rigid support member pivotally attached between the bin and the frame, a support track roller for upholding the end of the bin above the frame and permitting rolling movement therebetween, and a track mounted on the bin for receiving and riding on the support roller during rolling movement of the bin relative to the frame.

The motive means of the present invention comprises a hydraulic ram mounted between the bin and the frame capable of retracting and extending to place the bin in receiving and unloading positions, respectively.

The discharge means of the present invention comprises an unloading extension attached to the output end of the bin which is pivotally moveable between a retaining position and an unloading position. When the unloading extension moves to its unloading position, it pivots downwardly from its retaining position toward a transport carrier. Additionally, the discharge means comprises scissored side walls between the unloading extension and the bin, and relocating means for shifting the agricultural produce within the bin and the unloading extension and for unloading the agricultural products from the bin and the unloading extension.

The unloading extension comprises a door through which the agricultural produce may be unloaded from the unloading extension into a transport carrier. The door pivots about a horizontal axis and is located below the horizontal axis such that when the unloading extension is in its unloading position, the door pivots outward. The unloading extension further comprises a flexible drop chute attached between the door and the unloading extension which serves to reduce the speed of the fall of the agricultural produce as it is discharged from the bin. This reduces damage to the produce as it falls into a transport carrier.

The previously discussed relocating means comprises a conveyor belt operating longitudinally from the input end of the floor of the bin to the unloading extension, and means for selectively activating the conveyor belt so that agricultural produce received in the input end of the bin can be shifted rearwardly in the bin from the input end to the unloading extension. The conveyor belt can also be activated in the opposite direction so that produce unable to be unloaded can be shifted back to the input end of the bin and reloading may begin again.

The apparatus as discussed may also be incorporated into a system which achieves the objects as previously discussed. Therefore, the invention is embodied and broadly described herein as a harvester for agricultural produce comprising a frame, processing means mounted on the frame for harvesting and cleaning agricultural produce as the produce is advanced along a processing pathway, and storage means for accepting the harvested produce, storing the produce such that the center of gravity is distributed over the frame, and selectively transferring the produce to a transport carrier.

The processing means of the harvester comprises harvesting and cleaning sections. In the harvesting section, the agricultural produce is removed from the ground by two blades attached to the frame which dislodge soil and materials found in the soil. Because of the forward motion of the harvester, the dislodged soil and materials are carried forth onto the harvester. Through the use of two blades, two rows of produce can be harvested at once.

In the cleaning section, the agricultural produce is separated from debris. The cleaning station comprises three stations in which conveyor belts transport and clean harvested agricultural produce. Within the first station is an eccentric shaker roller mounted to the conveyor belt. This shaker roller provides a vibrating motion which shakes dirt from the harvested agricultural produce as it travels along the conveyor belt. Within the second and third stations the produce is further cleaned.

The processing means additionally comprise an elevator that transports the processed agricultural produce from the third cleaning station to the storage bin.

The invention also discloses a method for extracting, cleaning, temporarily storing and transferring recently harvested agricultural produce. The method comprises the steps of separating agricultural produce from associated waste materials, transporting the agricultural produce to a type of bin previously discussed, moving the bin into an unloading position, and discharging the agricultural produce from the bin.

The step of discharging the agricultural produce from the bin includes the step of relocating the agricultural produce by the use of a conveyor belt in the floor of the bin that extends from the input end of the bin to the output end. The conveyor belt moves both in the direction towards the output end of the bin and in the direction towards the input end. The conveyor belt can move in the direction of the output end in order to distribute the produce along the length of the bin. The conveyor belt can move in the opposite direction in situations such as when the bin contains too much produce for the transport carrier to handle, and extra produce must be left in the bin. In this situation, the produce not transferred to the transport carrier can be moved back towards the input end and filling of the bin may start again.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
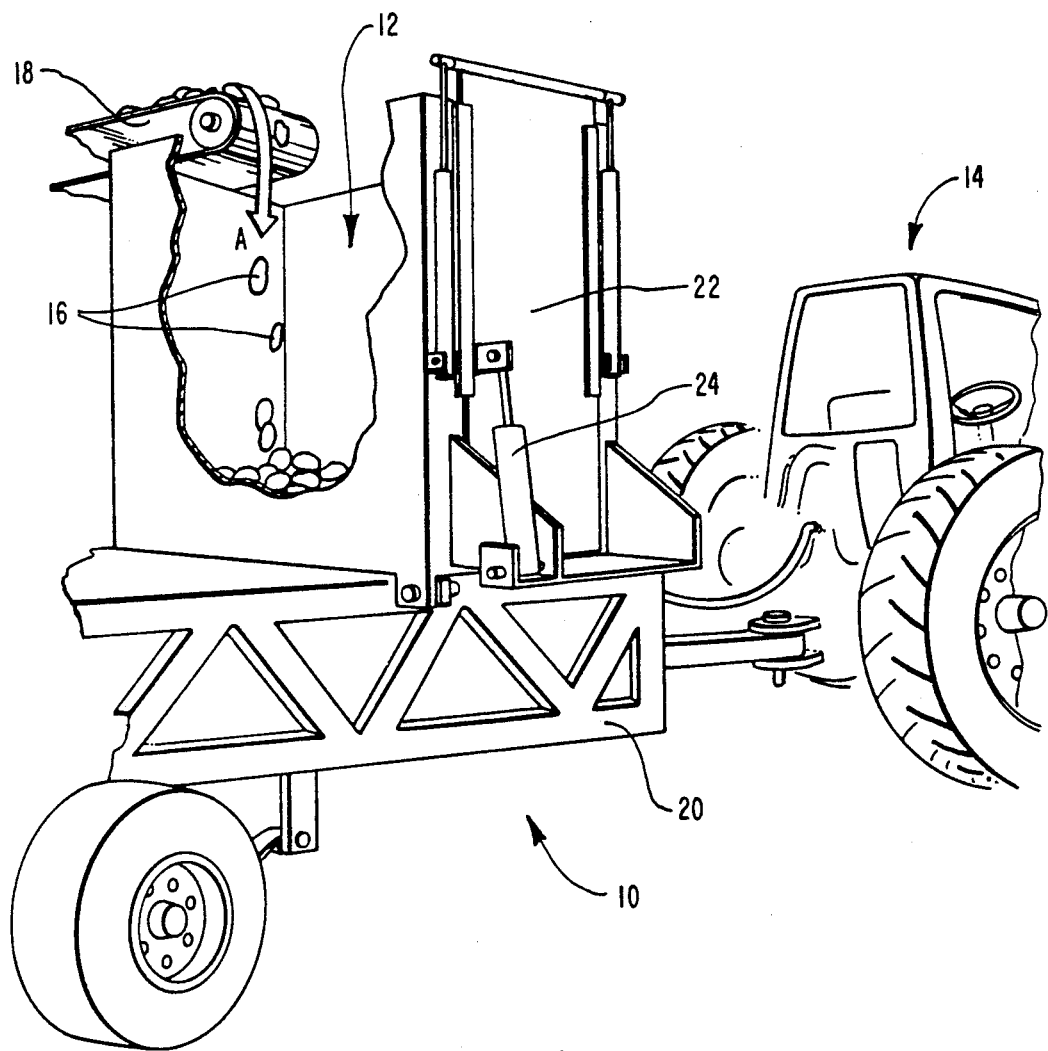
FIG. 1 is a perspective elevational view in partial break away of a prior art bin used to temporarily store agricultural produce on a harvester.
Figure 2:
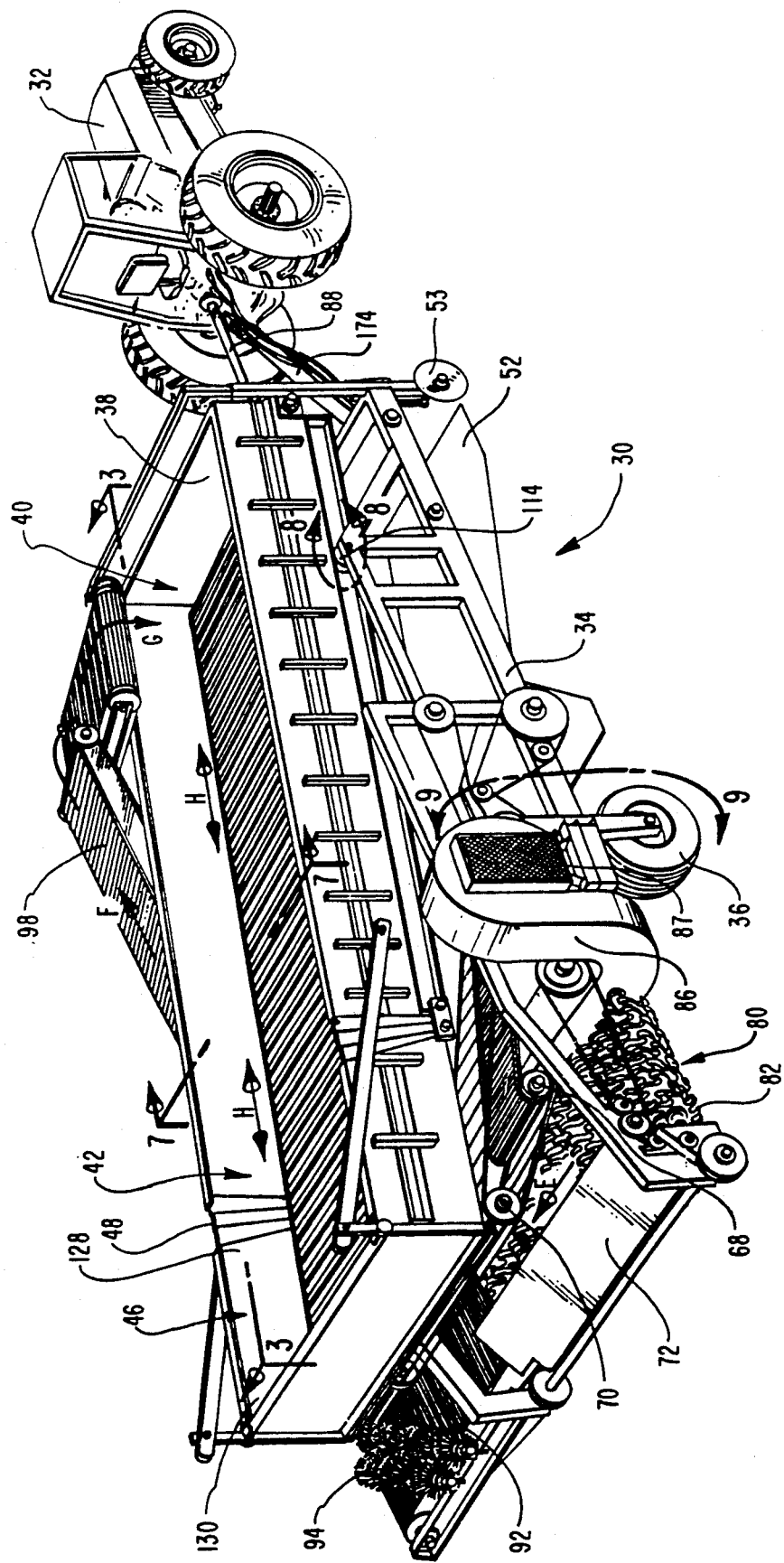
FIG. 2 is a detailed perspective view of one embodiment of a harvester incorporating the teachings of the present invention.
Figure 3:
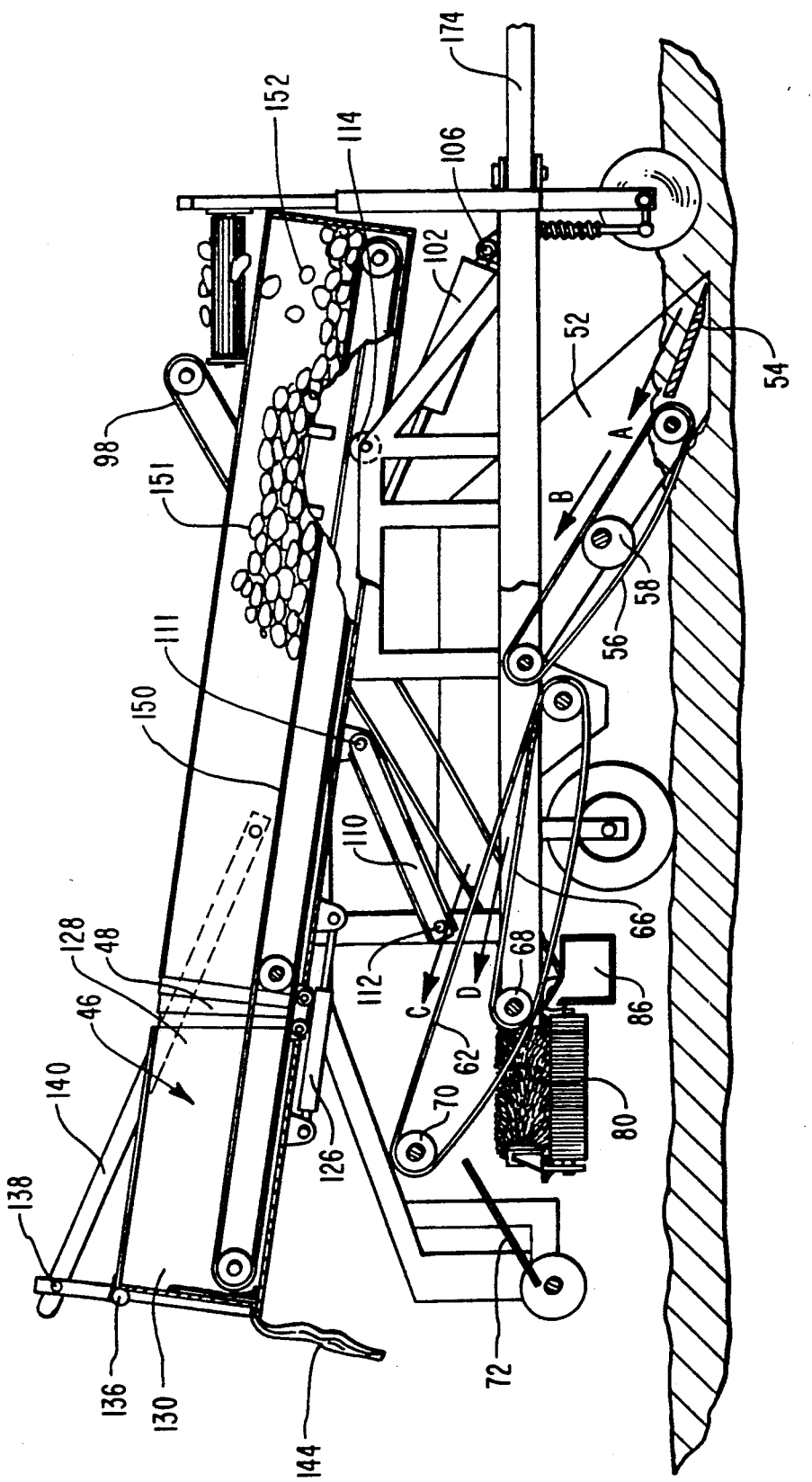
FIG. 3 is a cross-sectional elevation view of the harvester of FIG. 2 taken along section line 3—3 therein showing the storage bin in the receiving position thereof.

One presently preferred embodiment of a harvester incorporating the teachings of the present invention may be understood by reference to FIG. 2 and FIG. 3. In these figures, a harvester 30 can be seen being drawn by a towing vehicle 32 through a field of agricultural produce.

Harvester 30 comprises a frame 34 supported by two wheels 36. Mounted above frame 34 and extending the full length of frame 34 is an elongated, low-profile bin 38. Bin 38 is a storage container in which recently harvested produce is temporarily stored. Because the bin 38 extends the full length of the frame, when bin 38 is filled, the weight of the produce is distributed over the entire harvester 30. Thus, problems of concentrated weight in one area do not occur.

In the preferred embodiment within the scope of the present invention, bin 38 is as fully wide as the frame 34 of the harvester 30. The depth of the bin should be in the range from about two to about four feet. More preferably, the range should be from about two to about three feet. In the preferred embodiment, bin 38 is approximately 2 feet deep. The length of the bin should be in the range from about eighteen to about twenty-six feet. In the preferred embodiment, the length of the bin is approximately twenty-two feet, the approximate length of the harvester.

Generally, the bin 38 of the present invention has an input end 40 and an output end 42. Agricultural produce is introduced into the bin 38 at its input end 40. Attached to the output end 42 is an unloading extension 46, attached to bin 38 by scissored side walls 48. As will be explained later, the scissored side walls 48 help prevent spillage of produce as the unloading extension bends downwards in order to discharge the produce into a transport carrier 49.

Harvester 30 further comprises a processing area for the harvested agricultural produce. This processing area comprises two harvesting sections for removing two rows of agricultural produce from the soil, and a cleaning section comprised of conveyor belts for separating dirt and debris from the harvested produce as the produce is transported to the storage bin 38.

The exterior of the harvesting sections employed in the preferred embodiment shown in FIG. 2 can be seen generally as a harvesting chute 52 and two sharp circular cutting blades 53. The sharp circular cutting blades 53 project downward from the frame 34 in the area directly in front of harvesting chute 52. These circular cutting blades 53 cut vines and large debris before they enter the harvesting chute.

As can be seen in FIG. 3, within the harvesting chute 52 are two extracting blades 54 connected to frame 34. Although only one blade is shown, there are actually two blades 54 in the preferred embodiment so that two rows of produce can be harvested at once. These blades can be one of various types of blade, the choice of blade depending upon the soil type and condition. Blades 54 are positioned in a downward angle so that one end pierces the soil. The blades are operated just deep enough to recover all or nearly all of the agricultural produce. Due to the incline of the extracting blades 54, the extracted produce and soil flow in the direction indicated by arrow A in FIG. 3 when the harvester 30 is operating in a forward direction.

The displaced produce and soil, traveling towards the rear of the harvester then come into contact with the cleaning section illustrated in part by FIG. 2 and in part by FIG. 3. A first station of the cleaning section comprises two primary chain conveyors 56. The chain conveyors 56 are positioned adjacent to blades 54 in such a way that the extracted material traveling in a rearwardly manner from blades 54 is directed onto the chain conveyors 56 which travel in the direction indicated by Arrow B in FIG. 3. Again, only one chain conveyor 56 is pictured.

The blades 54 deliver the entire mass of agricultural produce and surrounding soil and debris onto chain conveyors 56, a rod-chain type of elevating conveyor that sifts out the loose, free-flowing soil, as well as small clods and stones. Every second or third link of the chain conveyors is usually offset upward about one link diameter from the plane of the ends. The intermediate links are either offset downward or are straight.

Because the chain conveyors 56 are comprised of a plurality of rods which are spaced apart, a sifting action occurs and soil is allowed to fall through the spaces between the plurality of rods. Particles of a diameter greater than the spaces between the plurality of rods remain on the chain conveyors 56. Since the aim of the present invention is the processing of agricultural produce, the maximum distance between rods is limited by the minimum agricultural produce size. It has been found that most produce can be contained upon chain conveyors 56 when the plurality of rods are spaced approximately one and one-half inches apart.

To assist in the sifting action, chain conveyors 56 pass over support idlers of various shapes which agitate the produce. Generally eccentric shaker rollers 58 are most commonly employed. These eccentric shaker rollers 58 are in the preferred embodiment within the scope of the present invention as shown in FIG. 3. Activation of the eccentric shaker rollers 58 has the effect of vibrating the chain conveyors 56. This vibrating action of the eccentric shaker rollers 58 has the effect of loosening the soil on the produce travelling on chain conveyors 56. It must be noted, however, that changing idlers (to a different size or shape) or increasing chain speed to increase agitation improves soil separation but may also increase damage to the agricultural produce. A balance is necessary.

A second section of the cleaning section which is included in the preferred embodiment of the present invention comprises a vine conveyor belt 62 and a secondary belt 66 which is overlapped by the vine conveyor belt 62. These belts are positioned following the chain conveyors 56 in such a way that material coming from chain conveyors 56 falls onto the vine conveyor belt 62 and secondary belt 66. The transfer of material from chain conveyors 56 to vine conveyor belt 62 and secondary belt 66 can best be shown in FIG. 3. After the material is fed from chain conveyors 56, the vine conveyor belt 62 and secondary belt 66 separate the vines and roots and other large obstructions from the agricultural produce. This separation occurs because of the structures of the vine conveyor belt 62 and secondary belt 66. The vine conveyor belt 62 is comprised of a plurality of rods which are spaced far enough apart to allow the produce to drop through the rods but close enough together so that vines and roots and other large obstructions are captured. Therefore, the materials travel initially along vine conveyor belt 62, and then produce and small debris fall through vine conveyor belt 62 onto the secondary belt 66 positioned below and overlapped by vine conveyor belt 62. Secondary belt 66 also is comprised of a plurality of rods, but the spaces between the rods are smaller than those of vine conveyor belt 62 and smaller than the diameters of the produce and small debris. Therefore, the produce and small debris remain upon secondary belt 66.

Essentially, the vine conveyor belt 62 separates large obstructive matter from the material that was initially processed by the vibrating chain conveyors 56. It has been found that the preferable amount of space between the rods comprising the vine conveyor belt 62 and secondary belt 66 falls between the range of about five to six inches and one and one-fourth to two inches respectively.

Once the separation of the produce from the vines and large obstructions occurs, the large obstructive materials continue to travel along the vine conveyor belt 62 in the direction indicated by arrow C in FIG. 3. The produce and small debris travel along secondary belt 66 in the direction indicated by arrow D in FIG. 3. The produce and small debris are thereafter deposited from the secondary belt 66 at the point where secondary belt 66 arcs at roller 68 to complete its circle.

It is important to note that although the vine conveyor belt 62 and the secondary belt 66 overlap and therefore travel in the same direction, each belt deposits its burden at different points. This result occurs because the vine conveyor belt 62 is of a greater length than the secondary belt 66. Therefore, the separation of the large obstructive materials from the produce and small debris is complete.

The large obstructive materials generally are deposited externally from the rear of the harvester 30. Generally, the materials simply fall off the vine conveyor belt 62 at the point the vine conveyor belt 62 rotates around its roller 70 and begins to travel in a direction towards the front of the harvester 30. Prevention of the materials from gaining access to the harvester 30 as they fall off the vine conveyor belt 62 is ensured by the installation of a guard 72. The guard 72 is welded on to the harvester 30 below the vine conveyor belt 62 and is angled to deflect materials falling from the vine conveyor belt 62 away from the harvester 30.

The produce and small debris traveling on the secondary belt 66 is deposited on a third station of the cleaning system. This third station is also comprised of a conveyor belt, but a conveyor belt which is generally characterized as a star table 80. The star table 80 best seen in FIG. 2 is positioned after the secondary belt 66, in such a way that the input end of the star table 80 is adjacent to the end of the secondary belt 66.

Also, the direction of the star table 80 is at a 90 degree angle to the position of the secondary belt 66. The direction can best be illustrated by reference to arrow E of FIG. 2. As will later be seen, this change of direction is an attempt to coordinate all the functions of the harvester 30 in as short a longitudinal length as possible.

At this point, a considerable amount of soil may still be attached to the agricultural produce. The separation of soil from the produce is accomplished by passing the mass over a bed of rotating, generally star-shaped rollers 82 comprising the star table 80. The star-shaped rollers 82 are evenly spaced apart. Rotation of the star-shaped rollers 82 as the produce and debris pass over the star table 80 provides for the separation of the produce soil and small debris.

In addition to the soil removal means provided by the generally star-shaped rollers 82, as the produce and small debris pass from the secondary belt 66 onto the star table 80, they are subjected to wind created by a blower 86 best illustrated in FIG. 2. The blower 86 is positioned underneath the secondary belt 66 adjacent to the star table 80. The blower 86 directs forced air against the produce and small debris as they pass from the secondary belt 66 to the star table 80. The air dislodges loose light-weight particles in still a further attempt to clean the agricultural produce.

The blower 86 is of a conventional type known to those skilled in the art. Entrance of air into the blower 86 is by way of an air filter intake 87. The blower 86 is driven by a power source 88, a tractor power take off, which may be an electric motor or a small gasoline engine. This power source can best be seen in FIG. 2 as the power drive line connected from the harvester to the towing vehicle. This power source 88 is not only the power source for the blower, but also the power source for everything.

The produce and small debris, now generally processed agricultural produce and rocks, travel along the star-shaped rollers 82 and are deposited onto a conveyor belt generally characterized as the rock separator conveyor belt 92. The rock separator conveyor belt 92 travels in the same direction as the star table 80.

The rock separator conveyor table 92 is comprised of a plurality of rods. Each rod has a plurality of bristles surrounding the rod in an upstanding position. Bristles made of plastic and having a height of approximately three-quarters of an inch have been found to be preferred.

As the agricultural produce and rocks are deposited onto the rock separator conveyor belt 92, they land on the bristles. Because of the size and nondensity of the agricultural produce, the produce remains on top of the bristles of the rock separator conveyor belt 92. The rocks, however, because of their density and tendency to be smaller than the produce fall through the bristles and are wedged between the bristles.

Directly above the rock conveyor separator belt 92 and attached to the frame 34 are a plurality of rotating brushes 94 which brush materials lying on top of the rock separator conveyor belt 92 off the rock separator conveyor belt 92 and towards the front of the harvester. Ideally, the rotating brushes 94 are angled to rotate against the direction of the rock separator conveyor belt to ensure that whatever is lying on top will be brushed off. At this point, only the produce is lying on top of the conveyor belt 92. The rocks are wedged between the bristles below. Thus, only the produce is brushed off the rock separator conveyor belt 92 by the rotating brushes. The rocks continue along the rock separator conveyor belt 92 wedged in the bristles until they are deposited off the harvester. The rocks generally fall from the bristles by gravity as the rock separator conveyor belt 92 rounds its roller.

The agricultural produce which is brushed off the rock separator conveyor belt 92 is pushed onto a means of transporting the processed agricultural produce to a storage area, bin 38. The means in the preferred embodiment within the scope of the present invention comprises a conveyor belt elevator 98. The direction of the elevator 98 is towards the front of the harvester 30. The direction of the conveyor belt elevator 98 can be illustrated by reference to arrow F of FIG. 2.

The elevator 98 ends at bin 38, therein depositing the processed agricultural produce. In the present invention, the elevator 98 is divided into two portions. The first portion of the elevator 98 moves towards the front of the harvester and lies parallel to the side of the bin 38. The direction of the first portion of elevator 98 is illustrated by arrow F of FIG. 2. The second portion of elevator 98 moves towards the bin 38 in a 90 degree angle from the first portion, the direction illustrated by arrow G of FIG. 2. Through the positioning of elevator 98, produce being brushed off the rock separator conveyor belt 92 is elevated towards the front of the harvester and then transported sideways into the bin. Because the bin 38 is positioned above the frame 34 and above the removing and cleaning mechanisms, the elevator 98 is vertically angled to elevate the agricultural produce from the level where the cleaning mechanism is stationed to the level where the agricultural produce is deposited for temporary storage in the bin 38.

The bin 38 is essentially a container having in one preferred embodiment within the scope of the invention, a floor, four sides and an open top. The structure of the bin 38 can best be illustrated by reference to FIGS. 2 and 3 which show the bin 38 in a receiving position. When bin 38 is in the receiving position, produce can be transported into the bin 38 from the elevator 98.

The bin 38 is capable of moving from the receiving position into an unloading position. The bin 38 in the unloading position is capable of unloading the agricultural produce to the transport carrier 49. Reference to FIGS. 3 through 6 will aid in demonstrating the movement of the bin 38.

The diagram in FIG. 3 illustrates the bin 38 as it is found in a receiving position. The input end 40 of the bin 38 is adjacent to and below the second portion of the elevator 98. The remainder of the bin 38 extends over the harvester, substantially covering most of the frame.

When the bin 38 is moved from the receiving position to the unloading position, the movement is in a generally longitudinal direction from the input end 40 to the output end 42. In combination with the longitudinal movement is an upward movement of the output end 42 that positions the output end 42 beyond the frame 34 and above the transport carrier 49 when the transport carrier is located adjacent the frame 34 at output end 42.

Figure 4:
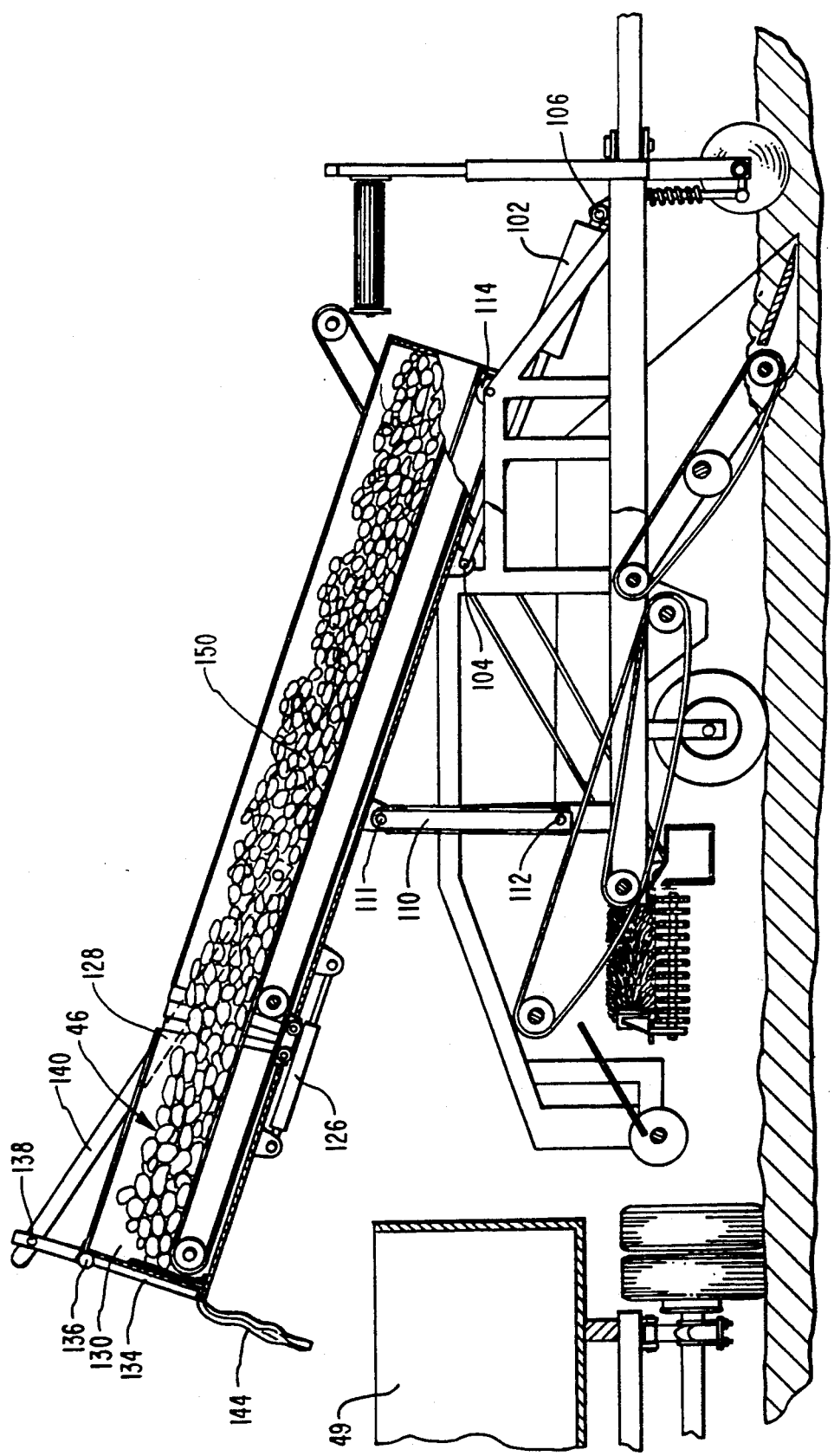
FIG. 4 is a cross-sectional elevation view of the harvester shown in FIG. 3 with the storage bin in the unloading position thereof.

In the preferred embodiment within the scope of the present invention, the translational movement by the bin 38 is accomplished by attaching a hydraulic ram 102 between the bin 38 and the frame 34, as is illustrated by FIGS. 3 through 6. The hydraulic ram 102 is capable of retracting and extending. When the hydraulic ram 102 is fully retracted, the bin 38 is in the receiving position. As the hydraulic ram 102 is extended, the bin 38 is moved from the receiving position to the unloading position. The unloading position is illustrated in FIG. 4.

Figure 5:
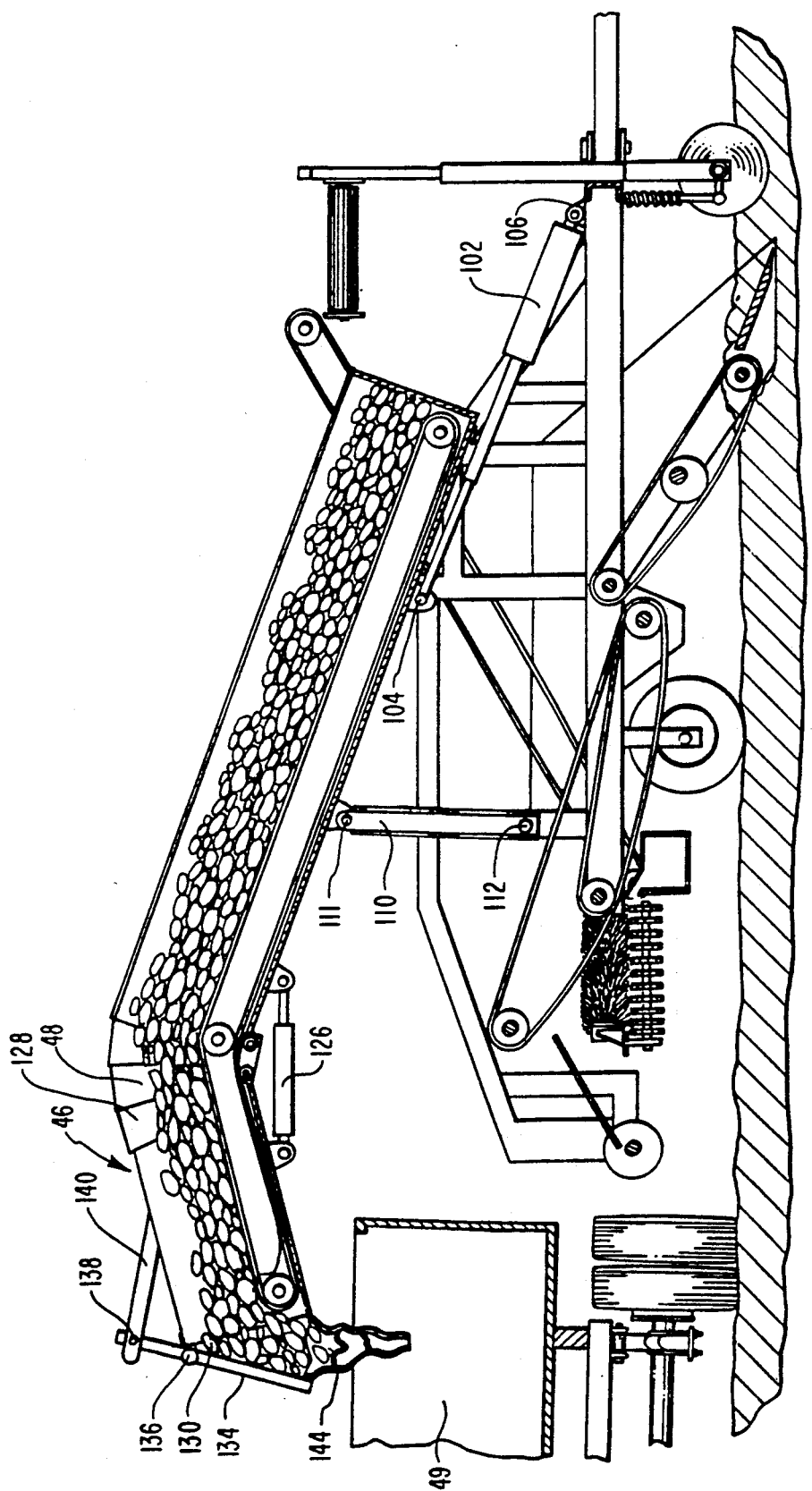
FIG. 5 is an elevational view of the harvester shown in FIG. 2 with the storage bin in the unloading position thereof and with the unloading extension in an initial stage of downward pivoted movement.

The hydraulic ram 102 provides no support for the bin 38. It is simply attached between the bin and the frame. Attachment is accomplished pivotally. One end of the hydraulic ram 102 is attached to a pivot shaft 104 which is also attached to the bin 38. Likewise, the other end of the hydraulic ram 102 is attached to a pivot shaft 106 which is also attached to the frame 34. The attachments are best illustrated in FIGS. 4 and 5.

In FIG. 4 it can be seen that with the bin 38 in an unloading position, the hydraulic ram 102 is fully extended. Again, the hydraulic ram 102 provides no support for the bin 38. It can be seen through break aways in FIGS. 3 and 4 that the bin 38 is instead supported by a separate and distinct structure that will be discussed in more detail.

The separate and distinct support structures for the bin 38 are comprised of two structures, rigid support members 110 and support rollers 114. The rigid support members 110, as can be seen in FIGS. 3 and 4, are pivotally attached at opposite ends between the main support axle 116 of frame 34, and a portion of the bin 38 located towards the output end 42 of bin 38 on both sides of bin 38. These rigid support members 110 support bin 38 when the bin 38 is elevated into its unloading position.

Figure 7:
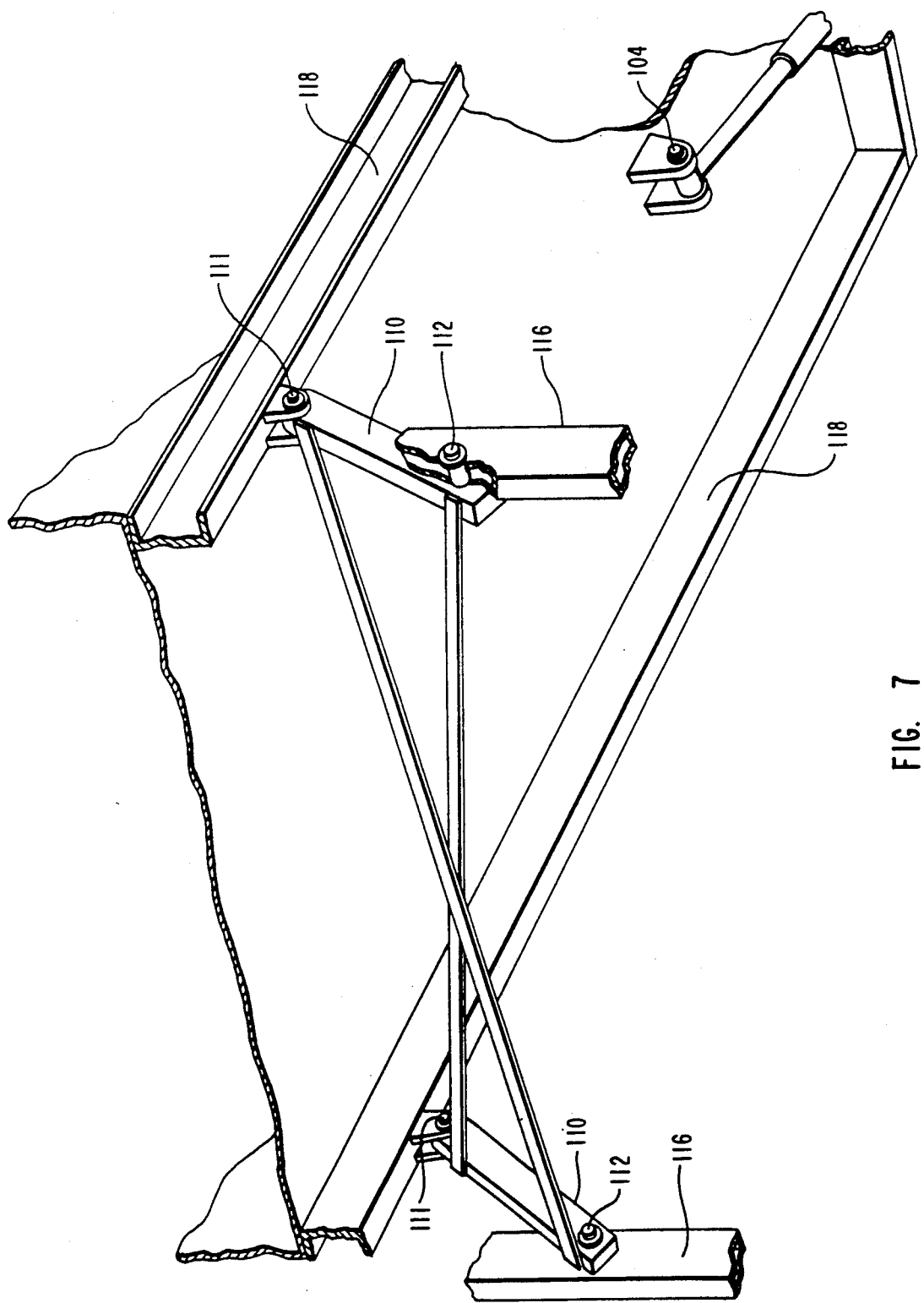
FIG. 7 is a detailed perspective view of bracing located beneath the storage bin of the harvester shown in FIG. 2.

The rigid support members 110 are illustrated in more detail in FIG. 7. FIG. 7 illustrates the section below the bin as shown by line 7—7 in FIG. 2. The rigid support members 110 are pivotally attached towards the output end of bin 34 at one end by a pivot shaft 111 and to the main support axle 116 of frame 34 and at the other end by a pivot shaft 112.

Figure 6:
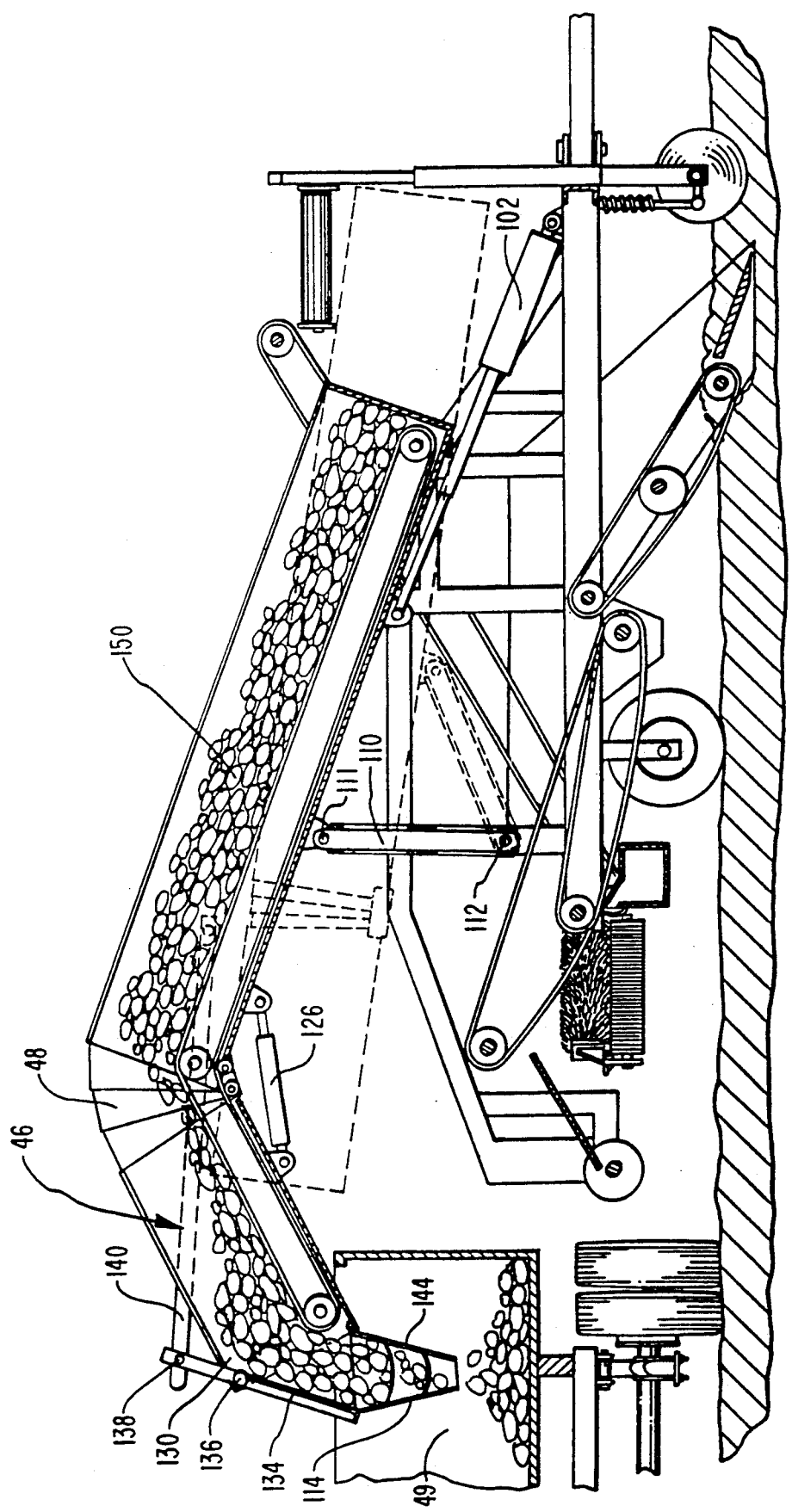
FIG. 6 is a cross-sectional elevation view of the harvester shown in FIG. 5 with the unloading extension in its fully downwardly pivoted position.

The movement of the rigid support members 110 as the bin 38 is coordinated from a receiving position to an unloading position is shown in FIG. 6. The rigid support members 110 in FIG. 6 are drawn with both phantom and solid lines. The phantom lines illustrate the position of the rigid support members 110 when the bin 38 is in a receiving position. As the hydraulic ram is extended, and the bin 38 is driven from a receiving position to an unloading position, the rigid support members 110 move to a vertical position. As the rigid support members 110 move to a vertical position, the output end 40 of the bin 38, to which the rigid support members 110 are attached is elevated.

The second support structure within the preferred embodiment of the present invention comprises a set of support rollers 114. These support rollers 114 are rotatably secured to the frame 34 and to tracks 118 mounted on the outside of bin 38 along the bottom of both sides. When the bin 38 is in the receiving position, the bin 38 rests on the support rollers 114 next to the frame 34. As the bin 38 is translated from the receiving position to the unloading position by the hydraulic ram 102, the support rollers 114 roll along the tracks 118 towards the input end 40 of the bin 38 and support and uphold the input end 40 of the bin away from the frame.

Figure 8:
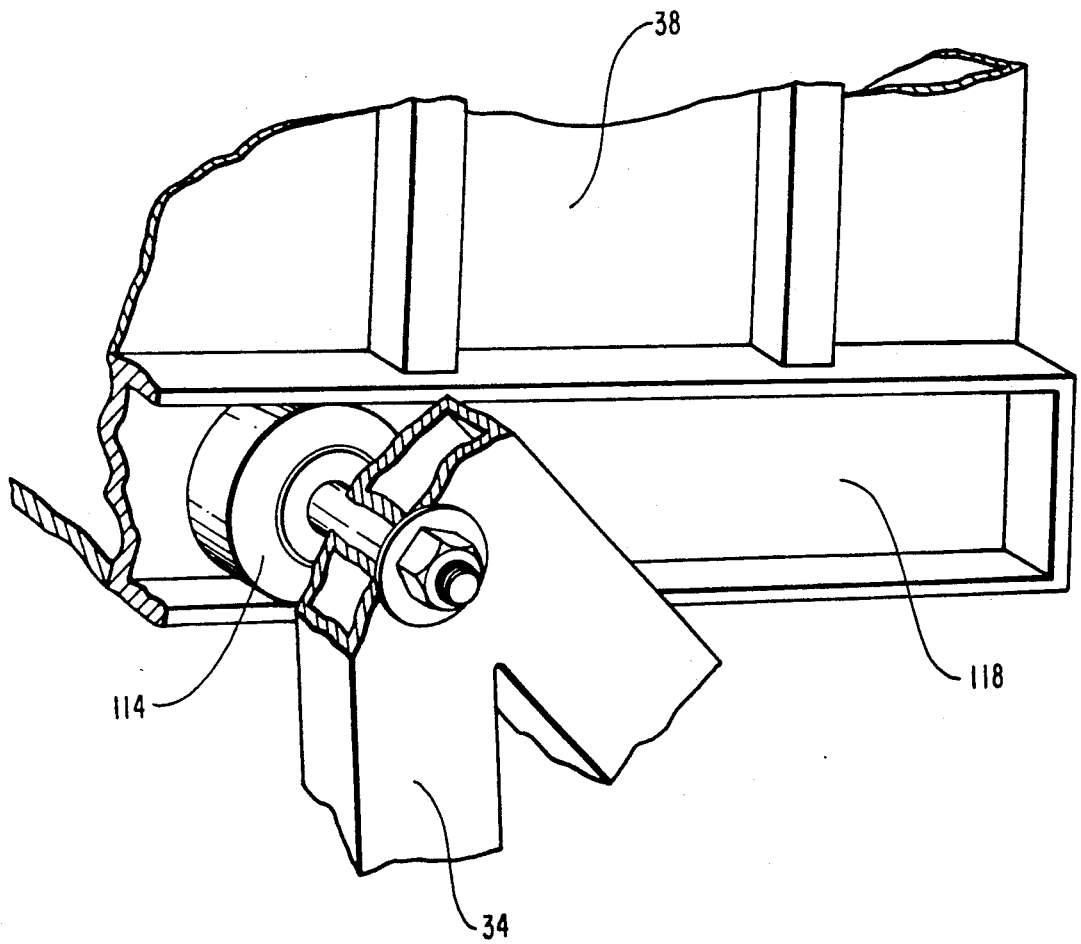
FIG. 8 is a detailed view of a support roller and cooperating roller track used to uphold the storage bin of the harvester shown in FIG. 2.

The specific structure of the support rollers 114 can be more thoroughly explained by reference to FIG. 8. In this drawing, taken from the area of the harvester indicated by line 8—8 of FIG. 2, it can be seen that the bin 38 is mounted with a track 118 on each of its sides. Each support roller 114 is placed inside and travels along the track 118. The support rollers 114 are also attached to the stationary frame 34. When the bin 38 is in the receiving position, the tracks 118 mounted to the bin 38 rest on the support rollers 114, thereby providing the support to the bin 38. As the bin 38 is moved into an unloading position, the bin 38 is translated over the support rollers 114 along the track 118. In the unloading position, the bin 38 is still supported by the support rollers connected to the frame. It has been found that support rollers with an approximately five inch diameter and a one and one-half inch width yield the best results.

It is also within the scope of the present invention to provide means for discharging from the bin 38 the temporarily stored agricultural produce. The discharging means is comprised of an unloading extension 46, and a hydraulic ram 126 to move the unloading extension 46.

The unloading extension 46 is pivotally attached to the output end 42 of the bin 38 by scissored walls 48. In one preferred embodiment within the scope of the invention, it has a floor, an open top, an input end 128, and an output end 130. The unloading extension 46 is capable of pivoted downward movement from a retaining position to an unloading position. When the unloading extension 46 is in a retaining position it is aligned with the bin 38 and merely acts as an extension of the bin 38. The retaining position of the unloading extension 46 is best illustrated in FIGS. 2 through 4.

In these figures, the unloading extension 46 appears to simply be a continuation of the bin 38. In fact this is partially true. Agricultural produce introduced into the bin 38 can also be stored in the unloading extension 46. The unloading extension 46 is configured in the same low-profile shape as the bin 38. Because it is attached to the bin 38, when bin 38 is translated to its unloading position, the unloading extension 46 is also translated a distance corresponding to the amount of translation experienced by the bin 38. In addition, as the output end 42 of the bin 38 is elevated and supported due to movement of the rigid support members 110 and the support rollers 114, the unloading extension 46 is likewise elevated and supported. This coordination with the bin 38, however, is temporary.

As stated previously, the unloading extension 46 can be moved from the retaining position into an unloading position. When the hydraulic ram 126 which is pivotally attached between the unloading extension 46 and the bin 38 is activated, the hydraulic ram 126 retracts and thereby collapses the output end 130 of the unloading extension 46 downward away from the line of bin 38. When hydraulic ram 126 is fully retracted, the unloading extension 46 is in the unloading position. FIG. 5 illustrates the unloading section 46 as it begins its downward movement, and FIG. 6 illustrates the full unloading position.

As it is shown in FIG. 6, the output end 130 of the unloading extension 46 when it is in the unloading position is lowered in relation to the output end 130 of the unloading extension 46 when it is in the retaining position. This lowered position decreases the distance which agricultural produce must travel when it is discharged from the output end 130 of the unloading extension 46 to an awaiting transport carrier 49. In the unloading position, the bottom of the input end 128 of the unloading extension 46 remains pivotally attached to the bin 38. The top of the input end 128 of the unloading extension 46 moves away from the bin. The scissored side walls 48, connected between the input end 128 of the unloading extension 46 and the output end 42 of the bin 38, unfold and expand. Failure to provide such a connection would result in an opening through which agricultural produce could accidentally escape. The scissored side walls 48 are made of a substance capable of folding and unfolding when the unloading extension 46 is moved from its retaining position to its unloading position.

When the unloading extension 46 is in the unloading position, agricultural produce exits through a produce discharge opening at the output end 130 of unloading extension 46. Covering the produce discharge opening is a door 134 which imprisons the agricultural produce in the bin 38 and the unloading extension 46 when the unloading extension 46 is in its retaining position. As the unloading extension 46 is moved into an unloading position, the door 134 opens and allows an exit for the soon to be discharged agricultural produce. The structure of the door 134 and its functional relation to the unloading extension 46 is best illustrated in FIGS. 4, 5 and 6.

In FIG. 4, it can be seen that the door 134 encloses the produce discharge opening of the output end 130 of the unloading extension 46. The door 134 pivots about a horizontal axis and is located below the horizontal axis. The door 134 is pivotally attached to the top of the unloading extension 46 at a pivot shaft 136. The door 134 then extends above the unloading extension where its end is pivotally attached by a pivot shaft 138 to rods 140 of fixed length. The other ends of rods 140 are pivotally attached to the sides of bin 38.

When the unloading extension 46 is moved into its unloading position, the door 134 pivots outward, allowing exit out of the produce.

When the door 134 is pivoted outward by the lowering of the unloading extension 46, a flexible drop chute 144 is released. The flexible drop chute 144 is attached to the bottom edge of the door 134 and to the edge of the output end 130 of the unloading extension 46. The flexible drop chute 144 is wide at the end attached to the output end 130 of the unloading extension 46 and the door 134, and thereafter narrows. This bottle-necked design results in produce being slowed down as it departs the unloading extension 46. As the agricultural produce departs from the harvester 30, it is unloaded into the transport carrier 49 through the flexible drop chute 144. Without the aid of the flexible drop chute 144, produce unloaded from the unloading extension 46 would quickly fall from the unloading extension 46 to the floor of the transport carrier and result in damaged produce because of the force with which the produce hits the floor of the transport carrier 49. The flexible drop chute 144 reduces this force by reducing the speed of the fall of the produce. Therefore, by using flexible drop chute 144, the agricultural produce is unloaded smoothly from the edge of the output end 130 of the unloading extension 46 through the flexible drop chute to the floor of the transport carrier 49. FIGS. 5 and 6 illustrate the agricultural produce as it is unloaded through the flexible drop chute.

Discharging the agricultural produce from the bin also includes relocating means for shifting the agricultural produce within the bin 38 and the unloading extension 46. In one preferred embodiment within the scope of the present invention, a selectively operable conveyor belt 150 extending longitudinally along the floor of the bin and the unloading extension 46 acts as the relocating means. The conveyor belt 150 moves both in the direction towards the output end 42 of the bin 38, and in the direction towards the input end 40 of the bin 38. The conveyor belt 150 moves in the direction of the output end 42 in order to distribute the produce along the length of the bin and the unloading extension, and also to unload the produce from the bin and unloading extension into a transport carrier. In FIG. 3, a pile of produce 151 can be seen shifted over to provide room for incoming produce 152.

The conveyor belt 150 also can move in the opposite direction. One situation where this is useful is where all of the produce in the bin cannot be unloaded into the transport carrier 49 and extra produce must be left in the bin. In this situation, the produce not transferred to the transport carrier can be shifted back towards the input end 40, and filling of bin 38 may begin again. A means to control the activation of the conveyor belt controls selection of the appropriate direction.

Another important aspect of the preferred embodiment within the scope of the present invention is a pair of wheels 36 which support the frame 34 of the harvester 30. The wheels 36 are controlled by a hydraulic steering mechanism in the tractor which allows substantial angular turning for maneuvering of the harvester 30 in the field. In addition, the wheels 36 can be turned either inboard or outboard on their overhead axle frame. An advantage to the wheels being placed outboard is the increased stability to the harvester. An advantage of the wheels being placed inboard is less damage to the unharvested produce.

Figure 9:
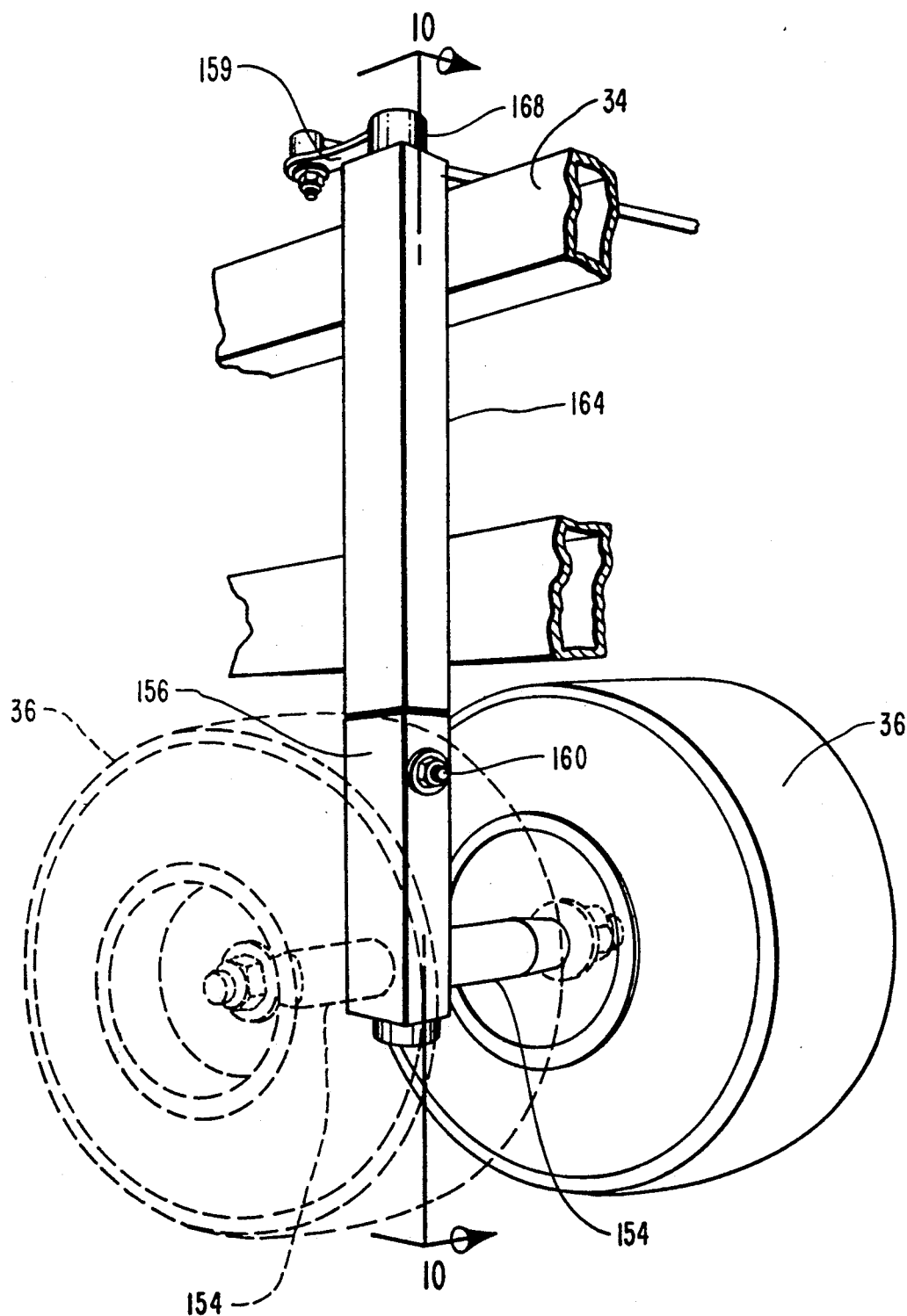
FIG. 9 is a perspective view showing a wheel of the harvester of FIG. 2 in an inboard and in an outboard position.
Figure 10:
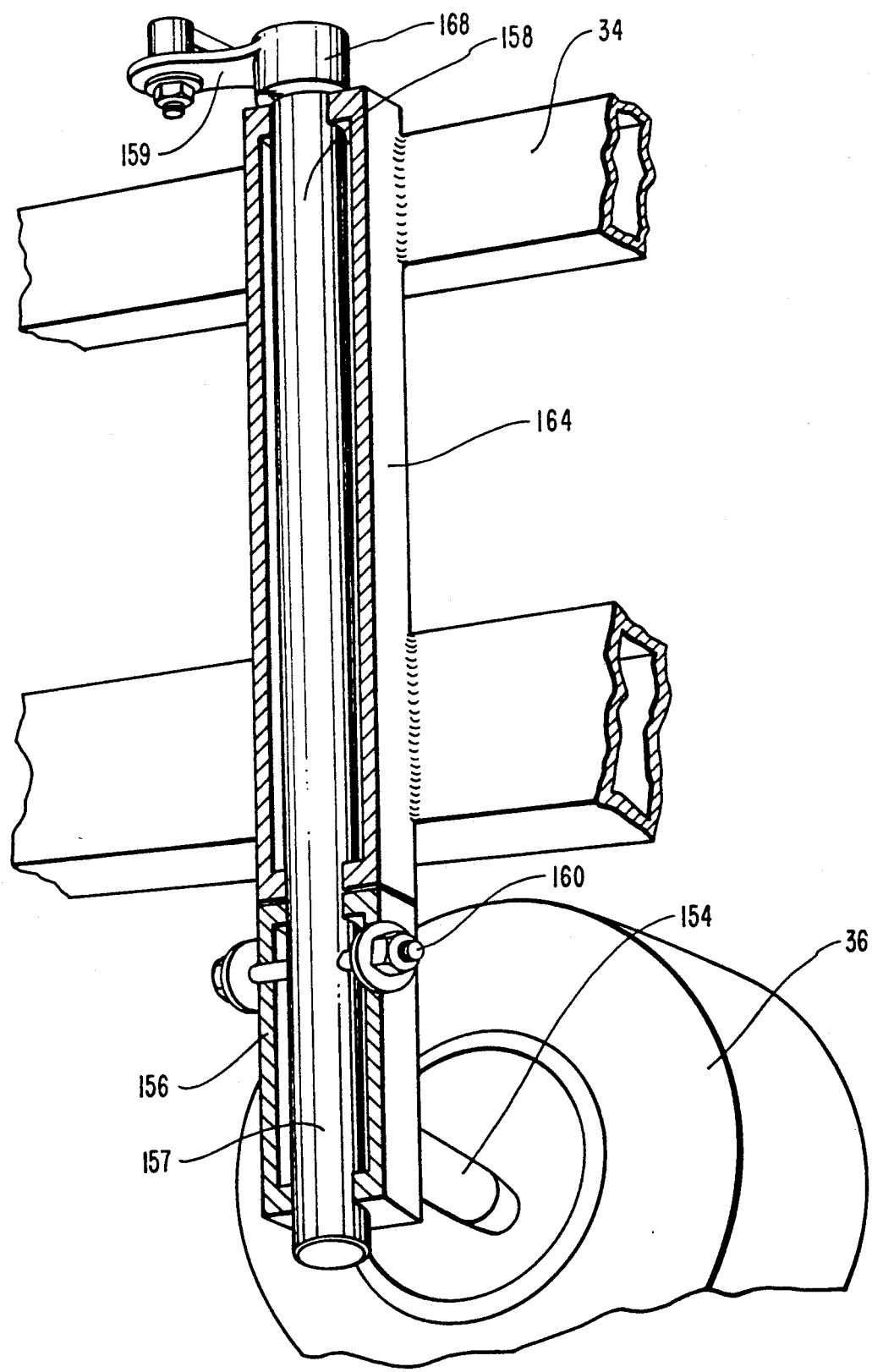
FIG. 10 is a perspective cross-sectional view of the wheel shown in FIG. 9 taken along section line 10-10 shown therein.

As shown by way of example in FIG. 9, the wheels 36 can be positioned inboard (shown in black line) or outboard (shown in phantom lines). The specific structure of the wheels can more thoroughly be shown by way of example in the cross section of FIG. 10.

In this drawing, the wheel 36 is attached to an axle 154 which is welded onto a square second sleeve 156. Square second sleeve 156 surrounds the lower wheel attachment portion 157 of a cylindrical steering shaft 158 that can rotate within second sleeve 156. Rotation of the cylindrical steering shaft is controlled by a steering arm 159 connected to the top portion of cylindrical steering shaft 158. The second sleeve 156 is not welded onto the cylindrical steering shaft 158 and so the cylindrical steering shaft can rotate freely within the second sleeve 156. However, in order to control the wheels, a removable bolt 160 can be inserted into eyes in the second sleeve 156 and in the lower wheel attachment portion 157 of the cylindrical steering shaft 158 so that the two structures are temporarily attached together. With the removable bolt in place, the steering arm 159 rotates not only the cylindrical steering shaft 158, but also the connected second sleeve 156. Thus, the wheels 36, connected to the second sleeve 156 by the axle 154, are also controlled by the steering arm 162. In other words, the wheels 36 rotate in response to the steering arm 162, and thus the harvester can be maneuvered over the agricultural fields.

The recited structure not only provides wheels 36 which can be controlled by a steering arm 159, but also provides wheels 36 which are capable of being turned from an inboard alignment to an outboard alignment. As previously mentioned, the square second sleeve 156 to which the wheels 36 are connected can be separated from the lower wheel attachment portion 157 of the cylindrical steering shaft 158 by removing the removable bolt 160. Once the square second sleeve 156 is separated it can be rotated 180 degrees and reattached to the lower wheel attachment portion 157 of the cylindrical steering shaft 158 by replacing the removable bolt 160. The usefulness of this capability is very important. With the wheels 36 in the outboard position, the stability of the harvester is increased. However, when the wheels are in the outboard position, they extend beyond the frame and crush the unharvested rows of produce. In this situation, having the wheels inboard is crucial to saving the unharvested produce. Once the row of produce is harvested, the wheels 36 can again be turned outboard and the harvester can again enjoy increased stability.

The top section of cylindrical steering shaft 158 is enclosed in a square fixed sleeve 164 that is welded to the frame 34. The square fixed sleeve 164 encloses the entire cylindrical steering shaft 158 except for the lower wheel attachment portion 157 which extends below the fixed sleeve. As with the second sleeve 156, the fixed sleeve 164 is not welded onto the cylindrical steering shaft 158. Cylindrical steering shaft 158 can rotate freely within the fixed sleeve 164. Above the fixed sleeve 164 is a collar 168 also attached to the steering arm 162 and surrounding the top of the cylindrical steering shaft 158. This collar 168 prevents the cylindrical steering shaft 158 from being dislodged within the fixed sleeve 164.

Yet another important aspect within the preferred embodiment within the scope of the present invention is means for a towing vehicle 14 to pull harvester 30 from a multiple of angles. An example of these means can be found in FIG. 11 The means comprises two structures, a rigid tongue 174 and a hydraulic extendable brace 176. The rigid tongue 174 is pivotally attached at one end to the frame 34 of harvester 30 and is pivotally attached at the opposite end to the towing vehicle 14. Towing vehicle 14 pulls the harvester 30 by means of the rigid tongue 174.

Figure 11:
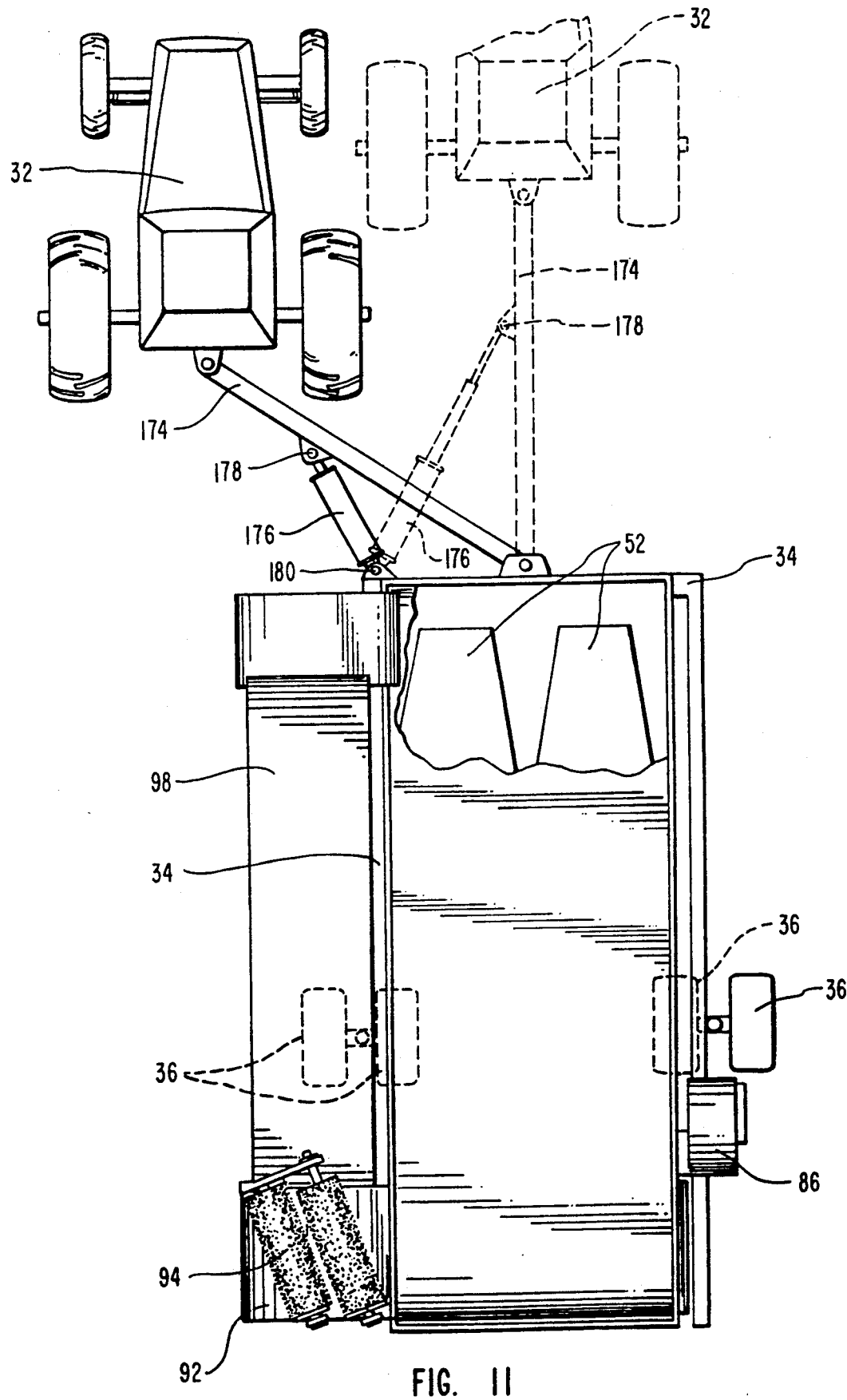
FIG. 11 is a plan view of the harvester of FIG. 2 and a vehicle for towing the harvester at a variable position relative the center thereof.

As shown by way of example in FIG. 11, a hydraulic extendable brace 176 can selectively control the angles at which the harvester is pulled by the towing vehicle. One end of the hydraulic extendable brace 176 is pivotally connected to the rigid tongue 174 by a pivot shaft 178. The other end of the hydraulic extendable brace 176 is pivotally connected to the harvester 30 by a pivot shaft 180. Retraction or extension of the hydraulic extendable brace 176 controls the angle between the harvester 30 and the rigid tongue 174 and therefore controls the angle between the harvester 30 and the towing vehicle 14. Pulling the harvester from different angles can be very useful. When the angle at which the towing vehicle pulls the harvester 30 can be controlled, the towing vehicle can be positioned in the least damaging way to the produce. For example, in order to not run over and destroy the crops on the right, the towing vehicle can pull the harvester from the left, saving the produce on the right.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for use in harvesting a field of agricultural produce to temporarily store and to selectively transfer the harvested produce into a transport carrier for removal from the field, the apparatus comprising:
    a) a frame;
    b) an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;
    c) support means for movably upholding said bin above said frame in said receiving and unloading positions and during any movement of said bin therebetween;
    d) motive means for driving said bin between said receiving and said unloading positions thereof; and
    e) discharge means for shifting harvested produce in said bin from said input end toward said output end thereof and for transferring harvested produce from said output end of said bin in said unloading position of said bin.

2. An apparatus as recited in claim 1, wherein said motive means comprises a hydraulic ram mounted between said bin and said frame, said hydraulic ram being moveable between a retracted position and an extended position to drive said bin between said receiving and unloading positions, respectively.

3. An apparatus as recited in claim 1, wherein said support means comprises:
    a) a rigid support member pivotally attached at opposite ends thereof between said frame and a portion of said bin located intermediate said input and output ends thereof; and
    b) a support roller upholding said input end of said bin above said frame and permitting rolling movement therebetween.

4. An apparatus as recited in claim 3, wherein said roller is rotatably secured to said frame, and said support means further comprises a track mounted on said bin for receiving and riding on said support roller during said rolling movement of said bin relative said frame.

5. An apparatus as recited in claim 1, wherein said discharge means comprises:
    a) an unloading extension located at the output end of said bin, said unloading extension having a produce discharge opening at the end thereof remote from said bin and being capable of pivoted downward movement from a retaining position to an unloading position;

b) scissored side walls between said unloading extension and said bin; and c) relocating means for shifting harvested produce in said bin from said input end toward said produce discharge opening and from said produce discharge opening to said input end.

6. An apparatus as recited in claim 5, wherein said relocating means comprises a selectively operable conveyor belt longitudinally disposed in said floor of said bin and said unloading extension, and operable to shift harvested produce from said input end of said floor of said bin to said produce discharge opening and from said produce discharge opening to said input end.

7. An apparatus as recited in claim 5, wherein said unloading extension comprises a door at said produce discharge opening of said unloading extension.

8. An apparatus as recited in claim 7, wherein said door pivots about a horizontal axis.

9. An apparatus as recited in claim 8, wherein said door is located below said horizontal axis.

10. An apparatus as recited in claim 9, wherein said door pivots outward as the unloading extension is moved between said retaining position and said unloading position.

11. An apparatus as recited in claim 5, wherein said discharge means further comprises a flexible drop chute at said produce discharge opening attached between said door and said unloading extension to reduce the speed of descent of the harvested produce transferred from said produce discharge opening.

12. An apparatus for use in harvesting a field of agricultural produce to temporarily store and to selectively transfer the harvested produce into a transport carrier for removal from the field, the apparatus comprising:

a) a frame;

b) wheels supporting said frame for movement about the field;

c) an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;

d) a hydraulic ram mounted between said bin and said frame, said hydraulic ram being moveable between a retracted position and an extended position to drive said bin between said receiving and unloading positions, respectively;

e) a rigid support member pivotally attached at opposite ends thereof between said frame and a portion of said bin located intermediate said input and output ends thereof;

f) a support roller upholding said input end of said bin above said frame and permitting rolling longitudinal movement therebetween;

g) an unloading extension located at the output end of said bin, said unloading extension having a produce discharge opening at the end thereof remote from said bin and being capable of pivoted downward movement from a retaining position to an unloading position; and h) a conveyor belt longitudinally disposed in said floor of said bin and said unloading extension, and operable to shift harvested produce from said input end of said floor of said bin to said produce discharge opening and from said produce discharge opening to said input end.

13. An apparatus as recited in claim 12, wherein said roller is rotatably secured to said frame, and said support means further comprises a track mounted on said bin for receiving and riding on said support roller during said rolling movement of said bin relative said frame.

14. An apparatus as recited in claim 12, wherein scissored side walls are positioned between said output end of said bin and said unloading extension to retain harvested produce in said bin when said unloading extension is pivoted into said unloading position thereof.

15. An apparatus as recited in claim 12, further comprising:

a) a door at said discharge opening of said door; and b) a flexible drop chute at said produce discharge opening attached between said door and said unloading extension to reduce the speed of descent of the harvested produce transferred from said produce discharge opening.

16. An apparatus as recited in claim 15, wherein said door is pivotable between a closed position and position in which said door is spaced apart outward from the floor of said unloading extension as the unloading extension pivots between said retaining position and said unloading position thereof.

17. An apparatus as recited in claim 12, wherein said wheels supporting said frame are positioned at a longitudinally medial position beneath said frame and wherein said apparatus further comprises stability adjustment means for selectively locating a selected one of the wheels either inboard or outboard of said frame, thereby providing greater stability to the apparatus.

18. An apparatus as recited in claim 17, wherein said stability adjustment means comprises:

a) a vertically disposed first sleeve fixed to said frame;

b) a cylindrical steering shaft rotatably disposed in and supported by said first sleeve, a wheel attachment portion of said steering shaft extending below said first sleeve;

c) a second sleeve slidably receivable on said wheel attachment portion of said steering shaft with said selected one of said wheels being rotatably secured thereto;

d) alignable first and second eyes formed in said second sleeve and in said wheel attachment portion of said steering shaft, respectively; and e) a bolt selectively insertable into said first and second eyes when aligned for attaching said second sleeve to said wheel attachment portion of said steering shaft to render said wheel and said second sleeve rigidly rotatable with said steering shaft.

19. A harvester for agricultural produce, said harvester comprising:

a) a frame;

b) processing means mounted on said frame for harvesting and cleaning the produce to produce harvested produce, said processing means advancing the produce along a processing pathway; and c) storage means for accepting the harvested produce, storing the harvested produce with the center of gravity thereof substantially centered over said frame, and for selectively transferring the harvested produce to a transport carrier, said storage means comprising:

1) an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;

2) support means for movably upholding said bin above said frame in said receiving and unloading positions and during any movement of said bin therebetween;

3) motive means for driving said bin between said receiving and said unloading positions thereof; and 4) a selectively operable conveyor belt longitudinally disposed int eh floor of said bin operable to shift produce from said input end to said output end of said bin and from said output end to said input end of said bin.

20. A harvester for agricultural produce, said harvester comprising:

a) a frame;

b) processing means mounted on said frame for harvesting and cleaning the produce to produce harvested produce said processing means advancing the produce along a processing pathway;

c) an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;

d) a hydraulic ram mounted between said bin and said frame, said hydraulic ram being moveable between a retracted position and an extended position to drive said bin between said receiving and unloading positions, respectively;

e) discharge means for shifting harvested produce in said bin from said input end toward said output end thereof and for transferring harvested produce from said output end of said bin in said unloading position of said bin; and f) coupling means for enabling a towing vehicle to pull said harvester while travelling ahead of said harvester at a selectively adjustable distance to the side of the center thereof.

21. A harvester as recited in claim 20, wherein said support means comprises:

a) a rigid support member pivotally attached at opposite ends thereof between said frame and a portion of said bin located intermediate said input and output ends thereof; and b) a support roller upholding said input end of said bin above said frame and permitting rolling movement therebetween.

22. An harvester as recited in claim 20, wherein said discharge means comprises:

a) an unloading extension located at the output end of said bin, said unloading extension having a produce discharge opening at the end thereof remote from said bin and being capable of pivoted downward movement from a retaining position to an unloading position;

b) scissored side walls between said unloading extension and said bin; and c) relocating means for shifting harvested produce within said bin from said input end toward said produce discharge opening and from said produce discharge opening to said input end.

23. An apparatus as recited in claim 22, wherein said relocating means comprises a selectively operable conveyor belt longitudinally disposed in said floor of said bin and said unloading extension, and operable to shift harvested produce from said input end of said floor of said bin to said produce discharge opening and from said produce discharge opening to said input end.

24. An apparatus as recited in claim 22, wherein said unloading extension comprises a door at said produce discharge opening of said unloading extension.

25. An apparatus as recited in claim 24, wherein said door pivots about a horizontal axis.

26. An apparatus as recited in claim 25, wherein the door is located below said horizontal axis.

27. An apparatus as recited in claim 26, wherein said door pivots outward as the unloading extension is moved between said retaining position and said unloading position.

28. An apparatus as recited in claim 22, wherein said discharge means further comprises a flexible drop chute at said produce discharge opening attached between said door and said unloading extension to reduce the speed of descent of the harvested produce transferred from said produce discharge opening.

29. A harvester as recited in claim 20, wherein said coupling means comprises:

a) a tongue pivotally attached at one end thereof to said frame and securable at the opposite end thereof to a towing vehicle for said harvester; and b) a hydraulically extendable brace pivotally attached between said frame and said tongue.

30. A harvester for agricultural produce, comprising:
a) a frame;
b) steerable wheels supporting said frame;
c) processing means mounted on said frame for harvesting and cleaning the produce to produce harvested produce said processing means advancing the produce along a processing pathway;
d) an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;
e) a hydraulic ram mounted between said bin and said frame, said hydraulic ram being moveable between a retracted position and an extended position to drive said bin between said receiving and unloading positions, respectively;
f) a rigid support member pivotally attached at opposite ends thereof between said frame and a portion of said bin located intermediate said input and output ends thereof;
g) a support roller upholding said input end of said bin above said frame and permitting rolling movement therebetween;
h) an unloading extension located at the output end of said bin, said unloading extension having a produce discharge opening at the end thereof remote from said bin and being capable of pivoted downward movement from a retaining position to an unloading position;
i) a door at said discharge opening, said door being pivotable between a closed position and position in which said door is spaced apart outward from the floor of said unloading extension as the unloading extension pivots between said retaining position and said unloading position thereof;
j) a flexible drop chute attached between the door and said unloading extension for reducing the rate of descent of the harvested produce being unloaded from said unloading extension;
k) scissored side walls are positioned between said output end of said bin and said unloading extension retain harvested produce in said bin when said unloading extension is pivoted into said unloading position thereof;
l) a selectively operable conveyor belt longitudinally disposed in the floor of said bin operable to shift produce from said input end to said output end of said bin and from said output end to said input end;
m) a tongue pivotally attached at one end thereof to said frame and securable at the opposite end thereof to a towing vehicle for said harvester; and
n) a hydraulically extendable brace pivotally attached between said frame and said tongue.

31. An apparatus as recited in claim 30, wherein said wheels supporting said frame are positioned at a longitudinally medial position beneath said frame and wherein said apparatus further comprises stability adjustment means for selectively locating a selected one of the wheels either inboard or outboard of said frame, thereby providing greater stability to the apparatus.

32. An apparatus as recited in claim 31, wherein said stability adjustment means comprises:
a) a vertically disposed first sleeve fixed to said frame;
b) a cylindrical steering shaft rotatably disposed in and supported by said first sleeve, a wheel attachment portion of said steering shaft extending below said first sleeve;
c) a second sleeve slidably receivable on said wheel attachment portion of said steering shaft with said selected one of said wheels being rotatably secured thereto;
d) alignable first and second eyes formed in said second sleeve and in said wheel attachment portion of said steering shaft, respectively; and
e) a bolt selectively insertable into said first and second eyes when aligned for attaching said second sleeve to said wheel attachment portion of said steering shaft to render said wheel and said second sleeve rigidly rotatable with said steering shaft.

33. A method for use in a field of agricultural produce to harvest, temporary store, and selectively transfer the produce to a transport carrier for removal from the field, the method comprising the steps of:
a) separating the agricultural produce from associated waste materials to produce harvested produce utilizing a frame towed through the field;
b) loading the harvested produce into an elongated, low profile bin mounted above and extending substantially the full length of said frame, said bin having input and output ends and a floor and being capable of movement between a receiving position in which the harvested produce is loaded into said bin at the input end thereof and an unloading position in which harvested produce in said bin is transferred from said output end of said bin to the transport carrier, movement of said bin from said receiving position to said unloading position comprising movement of said bin in a generally longitudinal direction from said input to said output end thereof in combination with upward movement of said output end of said bin, to position said output end of said bin beyond said frame and above the transport carrier when the transport carrier is located adjacent said frame at said output end of said bin;
c) driving said bin containing the agricultural produce from said receiving position into said unloading position; and
d) transferring the agricultural produce from said output end of said bin to the transport carrier.

34. A method as recited in claim 33, wherein the agricultural produce is grown in the ground and wherein said step of separating comprises:
a) removing the produce from the soil;
b) vibrating the produce removed from the sod on a roller belt with an eccentric shaker roller to remove soil therefrom;
c) removing large debris from the produce on a pair of overlapping conveyor belts; and d) removing clumps of soil from the agricultural produce on a roller belt having rollers with star shaped fittings.

35. A method as recited in claim 33, wherein in said step of driving, said bin is translated longitudinally in a direction from said input to said output end thereof, and said output end of said bin is elevated relative to said output end of said bin in said receiving position thereof.

36. A method as recited in claim 33, further comprising the step of transferring the agricultural produce within the bin by use of a conveyor belt in the floor of the bin extending longitudinally from the input end of the bin toward the output end.

37. A method as recited in claim 33, wherein said step of transferring the agricultural produce from said bin comprises the step of:
   a) attaching an unloading extension to the output end of said bin; and
   b) lowering the end of said unloading extension to decrease the distance agricultural produce falls from said bin into the transport carrier.

38. A harvester as recited in claim 19, and the produce is grown in the ground wherein said processing means comprises:
   a) a harvesting section at which the produce is removed from the ground; and
   b) a cleaning section at which the agricultural produce is separated from foreign materials.

39. A harvester as recited in claim 38, wherein said harvesting section comprises a blade attached below said frame at a position below the produce in the soil.

40. A harvester as recited in claim 38, wherein said cleaning section comprises:
   a) a first station for removing soil from the produce;
   b) a second station for removing large debris from the produce; and
   c) a third station for removing rocks from the produce.

41. A harvester as recited in claim 40, wherein said first station comprises a chain conveyor for receiving produce directly from said blade, said chain conveyor being agitated by an eccentric shaker roller.

42. A harvester as recited in claim 19, wherein said processing means further comprises an elevator for receiving the harvested produce and for transporting the harvested produce to said storage means.

* * * * *

UNITED STATES PATENT AND TRADEMARK OFFICE
CERTIFICATE OF CORRECTION

PATENT NO. : 5,103,623
DATED : April 14, 1992
INVENTOR(S) : James W. Herrett

It is certified that error appears in the above-indentified patent and that said Letters Patent is hereby corrected as shown below:

Column 5, line 44, after "bin" insert --and to move the produce from the bin into a transport carrier--.

Column 15, line 41, after "FIG. 11" insert --.--.

Column 19, line 39, "int eh" should be --in the --.

Signed and Sealed this

Twenty-eighth Day of September, 1993

Attest:

BRUCE LEHMAN

*Attesting Officer*  *Commissioner of Patents and Trademarks*